Nov. 6, 1923.
E. BENSON
1,473,332
DETECTION OF SUBMERGED OBJECTS
Filed Jan. 21, 1918     2 Sheets-Sheet 1
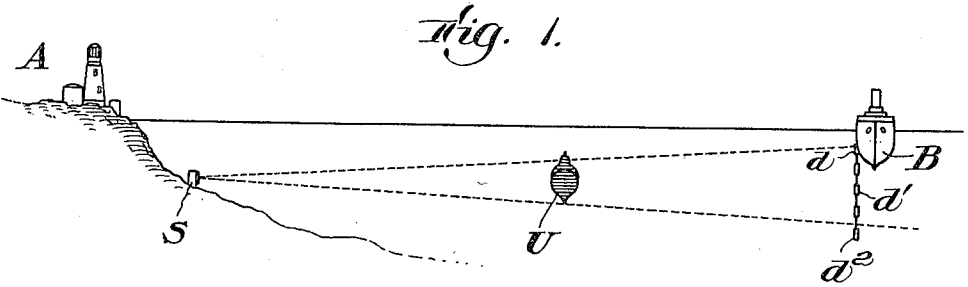
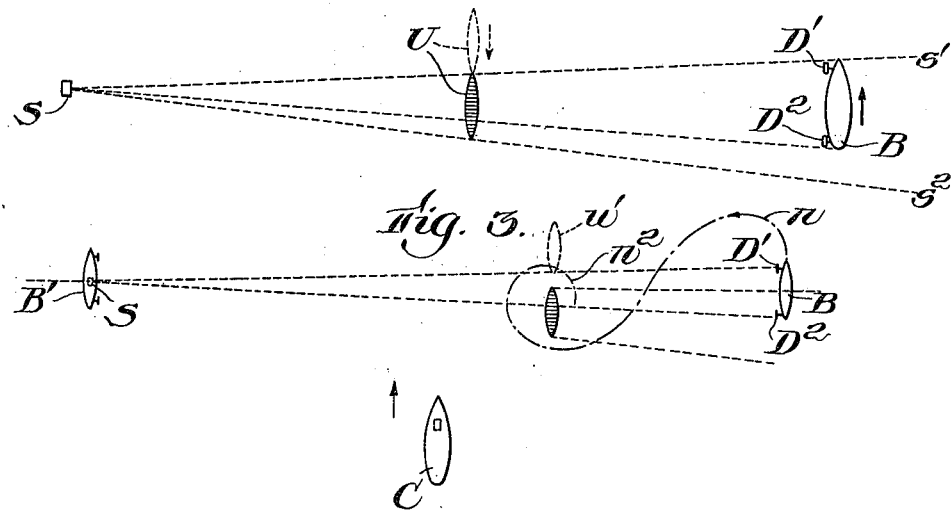
Inventor:
Elof Benson,
by Roberts, Roberts & Cushman
his Attorneys Nov. 6, 1923. 1,473,332
E. BENSON
DETECTION OF SUBMERGED OBJECTS
Filed Jan. 21, 1918  2 Sheets-Sheet 2

Inventor:
Elof Benson,
by Roberts, Roberts & Cushman
his Attorneys.

Patented Nov. 6, 1923.

1,473,332

UNITED STATES PATENT OFFICE.

ELOF BENSON, OF NEWTON HIGHLANDS, MASSACHUSETTS, ASSIGNOR OF ONE-HALF TO FRANCIS H. WILLIAMS, OF BOSTON, MASSACHUSETTS.

DETECTION OF SUBMERGED OBJECTS.

Application filed January 21, 1918. Serial No. 212,923.

*To all whom it may concern:*

Be it known that I, ELOF BENSON, a citizen of the United States of America, and resident of Newton Highlands, in the county of Middlesex and State of Massachusetts, have invented new and useful Improvements in the Detection of Submerged Objects, of which the following is a specification.

This invention relates to locating submerged objects, whether stationary or movable, from a point of observation distant from the position of the object to be so located. The invention is useful for the location of objects submerged between the surface and the bottom of a body of water, is susceptible of application to either civil or military use, and is particularly useful for the discovery of the position of submerged mines or of stationary or movable submarine vessels.

It has heretofore been proposed to determine the position of a submerged object, such as a submarine vessel, by determining the direction and intensity of the proper sounds made by the operation of the submarine vessel or of sounds reflected from the vessel; the naval warfare now in progress has produced many ingenious proposals for determining the position by estimate of the approximate distance and bearing from an observation station of such an object as a submerged submarine boat, but I am not aware of any devices of this nature adapted to determine with accuracy the exact direction from the observer of the submerged object.

The present invention has for its principal object the ready and accurate determination of the bearing, as well as the approximate distance from a fixed or movable observation station of such a submerged object, to provide an art of and apparatus for determining the bearing either from a shore station or a floating station of a movable or stationary submerged object, and to utilize for this purpose the phenomenon of the acoustic shadow.

The invention is primarily concerned with means for creating at a source, which may be stationary or movable, a submarine sound of a quality determined by experiment to be peculiarly adaptable for definite observation at a distance and to be propagated in right lines in homogeneous waters such as the open sea, a channel, harbor or fairway; and with a method of utilizing the shadow cast by a submerged object with respect to the waves of sound propagated from the source to determine at a distant observation station the position, dimensions, nature and movement of the object casting the shadow. While the invention utilizes at the observation station a sound detector or a series of sound detectors, the said sound detectors may be microphones or the like of known or usual form and are not in themselves herein claimed to be of my invention.

In the accompanying drawings,—

Figure 1 is a diagram in vertical section showing a shore station, an object whose presence is to be detected, and an observation station, shown as carried by a vessel;

Figure 2 is a diagram in plan illustrating a typical condition for the creation and observation of a shadow by the new method;

Figure 3 is a plan illustrating the application of the method to the detection of a submarine by guard vessels convoying a ship;

Figure 4:
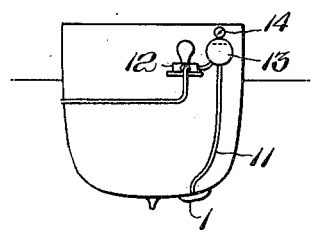
Figure 4 is a vertical section illustrating a sound-emitting apparatus as applied to a vessel.

It is elementary that an obstruction between a source of sound and an observer will cast a shadow in a manner analogous to a shadow cast by an obstruction between a source of light and the segment of the sphere in space in which the light is central. A great difference of degree over the behavior of light in respect to the sharpness of the shadow and, to a less extent, in respect to the direction of the propagation of the sound, as shown by the edges or boundaries by which a shadow can be determined is, however, well understood by those who have had occasion to observe the behavior of obstructed sources of sound to be characteristic of sound waves in an elastic gaseous medium such as the air.

Sounds propagated in such a gaseous medium behave differently from sounds propagated in a dense and relatively inelastic medium, such as a body of water. In the more dense medium, in which the velocity of the sound wave is of the order of four times that in air, I have determined by experiment that the direction of propagation is very nearly a straight line. The degree of aberration in the direction, or of deflection from the direction of propagation in a straight line, the degree of diffraction about the edge of an obstruction, or of refraction as by accidental wedges or prisms of water of different density, I have moreover determined to be negligible for the purposes of this invention, and to depend upon the pitch of the sound, lesser wave lengths giving better defined and straighter paths of audibility than sounds of lower pitch or greater wave-length. I have also determined the practical superiority for the purpose of casting sharp acoustic shadows of submerged objects, of a source of submarine sound acting as nearly as possible at a mathematical point, so that the source itself has an angular magnitude of negligible extent as measured from even a short distance, and the shadow is without penumbra.

Apparatus for the practice of my improved art therefore preferably comprises a submerged point source of high-pitched sounds. In some cases this source may be a bell of the proper high pitch, but I have found it difficult to obtain from a bell a sufficient amplitude of vibration at the high pitch or rate of vibration desired, or to design a bell effective as a point source, and hence prefer to provide a non-vibrating source of strong impulses or sound waves in the water adapted to be standardized or controlled with respect to the frequency, and hence the pitch, of the impulses or waves making up the sound, and if desired, also adapted to be controlled to vary the amplitude of the wave.

The Latour siren is a familiar instrument for producing sound vibrations in the air by the impact of intermittent fluid impulses, and I have enabled this device to act as a point source of strong high-pitched sounds for use under water by adapting it to be operated to interrupt a current of inelastic fluid, such as water under high pressure, instead of an elastic fluid, such as air or steam under pressure, as heretofore employed, and by other changes now to be explained.

Figure 7:
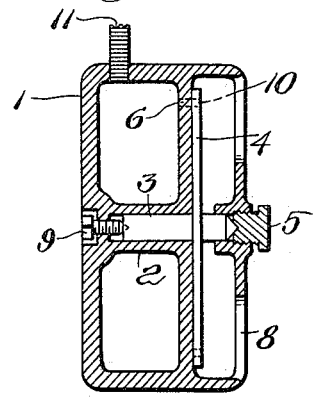
Figure 7 is an elevation partly in vertical central section of one form of siren illustrating preferred means for creating the sound.
Figure 11:
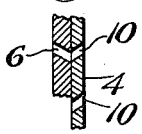
Figure 11 is a detail section on a line tangential to the circle of holes 10, Fig. 7.
Figure 8:
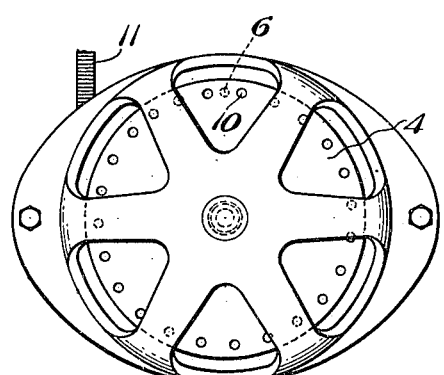
Figure 8 is a side elevation of the device shown in Fig. 7.

The siren may be of the type shown in Fig. 7, having a hollow casing 1, a central bearing 2 for a spindle 3, a disk 4 mounted on the spindle 3, and having a preferably adjustable step bearing 5. The disk 4 rotates in contact with a discharge opening 6 in the casing 1 and as shown in Figs. 8 and 11 a series of evenly-spaced openings 10 in the disk 4 pass in rapid, even recurrence over the opening 6 whenever pressure within the chamber or casing 1 sets the disk 4 in motion. The successive impacts of fluid under greater pressure within the casing than the water-pressure without are the sources of the dynamic phase of the sound-waves; the intervals between the holes measure the recession or rarefaction phase of the sound waves.

Rotation of the disk may, as shown in Fig. 11, be secured by the flow through the discharge opening 6 by suitably inclining the opening 6 and the holes 10 in opposite directions. When such a siren is operated under water the speed of the disk 4, and hence the pitch, will be relatively constant for a given pressure of water in the chamber 1.

As illustrated in Fig. 7, the preferred form of the device comprises adjustment for both ends of the bearing for the spindle 3, the step bearing 5 being movable as by being screwed into a central opening in a protecting grid 8, the spindle 3 being held toward the step bearing 5 by an adjustable cone-pointed screw 9.

Pressure within the casing 1 is maintained by a suitable pump and air-chambered accumulator communicating with the casing 1 through inlet pipe 11. As illustrated in Fig. 4, the siren device 1 may be mounted on the outer bottom of a ship, within which a pump 12 and accumulator 13 are mounted to supply the pipe 11 with water under the desired fixed pressure, as shown by gauge 14. The pitch or incline of the holes 10 and the discharge opening 6 will be such as to secure the desired number of passages of holes 10 in a given interval of time at the opening 6 to cause under-water sounds of the desired high pitch. A sound of suitable wave-length or pitch is made at about 5000 impulses per second. I have under some conditions obtained satisfactory results when the impulses are as low as 1200 per second, and it will be obvious that the pitch of the sound may be more or less than 5000 to the second, within the audible limit.

Figure 10:
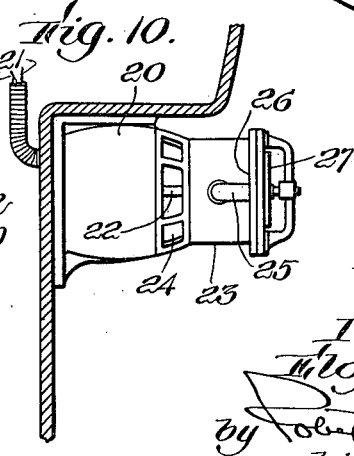
Figure 10 illustrates a modified form of the sound-emitting device.

In order to make the pitch of the siren device accurate, fixed and invariable by accident, and independent of the amplitude or volume of the sound, I may arrange for the rotation of the perforated disk of the siren independently of the pressure of the fluid relied upon to give the wave-creating impulses upon passage of one of the perforations in the disk. As shown in Fig. 10, for instance, an enclosed electric motor 20 adapted to be driven at a relatively constant rate by electric current transmitted through the leads 21 may be mounted on the exterior of the bottom of the ship or in other submerged position. On the casing of the motor 20 and directly connected to its shaft 22 I may provide a centrifugal pump of any suitable construction at 23, said pump being adapted to deliver water taken in through the openings 24 through the pipe 25 which is in communication with the hole 26 in the pump casing, this hole being arranged to be covered and uncovered by the perforations in the disk 27 which may be fixed to the motor shaft 22, which may have bearings similar to those for the spindle 3 shown in Fig. 7. Upon driving the motor 20 a pressure current is set up through the pipe 25 which is covered and uncovered by motion of the disk 4 as described above. When the shaft 22 and disk 27 are motor driven, the holes in the disk and the holes 26 in the casing are preferably parallel with the axis of the disk. Any form of the siren may be suspended, the connections 11 or 21 being made flexible, at any desired depth by suitable cable and weight, instead of being attached to a ship carrying it.

It will be obvious that the pump 23 may be omitted, and the pipe 25 connected to such a source as the pipe 11 of Fig. 4 of water under pressure, the disk 27 being driven by the motor, the amplitude only of the sound then being controlled by the pressure in pipe 11.

Figure 6:
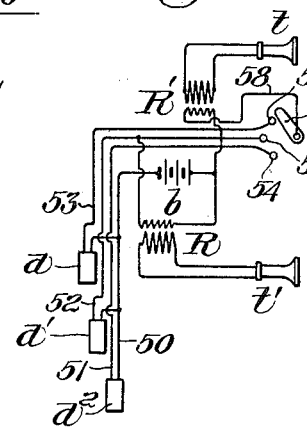
Figure 6 is a diagram illustrating microphones and telephones comprising a preferred form of sound-detecting means.
Figure 5:
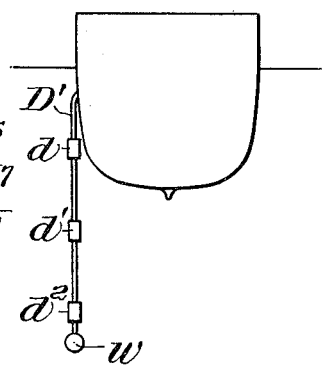
Figure 5 is a view similar to Fig. 4, illustrating a vessel equipped with sound-detecting means.
Figure 9:
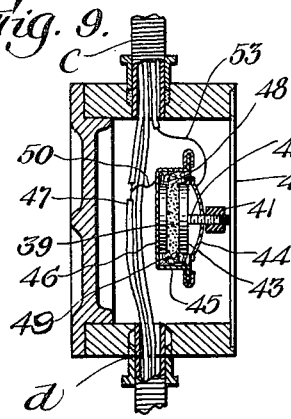
Figure 9 is a section through a preferred form of microphone employed as the sound-detecting means.

The sounds are detected at a distant point by any suitable submerged detector, for instance by a microphone and telephone. One arrangement is illustrated in Figs. 5, 6 and 9, in which $d$ is a water-tight metal casing having soldered or brazed on one side a diaphragm 40 on which an insulating sleeve 41 is mounted, in turn carrying a stud 42 of conducting material, and attached carbon button 43, with which contact is made by a light spring-bow 44 connected to line wire 53. A free metallic box 45 having in it a carbon button 46 is connected at 47 to the other line wire 50, and holds at its rim a mica annulus 48 on which the ends of bow 44 are fastened. Carbon granules 39 held in place by a loose stuffing 49 of cotton or silk fibre constitute with the button 46 and container 45 that element of the microphone remaining relatively fixed by inertia when the diaphragm 40 and button 43 vibrate. The whole box $d$ may contain air at atmospheric pressure.

Line wires 50, 53, are connected in series with a battery $b$ and the primary of an induction-coil R of which the secondary is in series with a telephone receiver $t'$.

The observing station may comprise no more than above mentioned in some cases, for the use of a single observer listening at telephone $t$, the microphone $d$ being suspended at a suitable depth by a waterproof tubular conduit $c$ containing the lines 50, 53. But when it is desired rapidly to measure or estimate the vertical dimensions of an acoustic shadow, I prefer to arrange a series of detectors $d$ at different depths on a cable such as conduit $c$, weighed at $w$, and to provide for listening at one of them, as $d'$, Fig. 6, and for rapidly connecting an observing telephone to the others in turn, so as to discover which of the detectors are in the shadow and which above or below it. I have shown but three detectors, $d$, $d'$, $d^2$, in the diagram, but it will be understood that as many more as desired, for instance one at every fathom of a conduit two hundred feet long, may be provided.

One pole of the battery $b$ may be connected to a common line 50 traversing all of the casings, leads 51, 52 and 53 from the respective michrophones being carried to terminals 54, 55, 56, adapted to be connected in succession by a depth indicating sweeping contact arm 57 through lead 58 and the primary of an induction coil R' to the other pole of the battery. Telephone $t$ is connected to the secondary of coil R', and responds to the condition found at each microphone $d$, $d'$, $d^2$, etc., as contact arm 57 is moved. The depth and vertical height of an acoustic shadow may be rapidly determined by change in the sound or silence at $t$ in respective positions of arm 57, which is at the observer's station.

Referring now to Figs. 1 and 2, let it be supposed that at A, a shore station, a submerged source of sound S is provided, preferably of the kind above explained.

All vessels in the neighborhood and provided with any type of submerged sound detector will perceive the sound from source S so long as the water between is free of sound opaque or dampening bodies, such as a submarine U. At B, for instance, is a guardship equipped with two series D' and D² of submerged microphone detectors connected to a suitable telephone on her commander's bridge. Whenever, by the proper motion of either guardship or submarine, S, U, and D' or D² are in line, the sound of the siren at A will cease at one or more of the detectors. The bearing of station A from ship B being known, her commander is informed of a submerged object on the line S, D', $s'$, for instance. The angular magnitude of the object from station A (assuming A to be immediately over S) can then be determined by noting the time when the sound reappears and allowing for the known speed of ship B. If the object is suspected to be moving, the ship B goes about, and repeats the observation on the same course in the opposite direction. A mean of the value of the observation of time of passage at known speed through the acoustic shadow will then give the value of the angle $s'$, S, $s^2$, from which, if the vessel is an enemy submarine of known length, the approximate distances S, U, or B, U, can be computed readily.

Or the vertical angular magnitude of the shadow may be measured at B by raising and lowering a detector $d$ once the sound has ceased; or by use of the device shown in Fig. 6. Preferably the observations are checked by providing at least two series $D'$, $D^2$, of a plurality of detectors $d$ one above the other at suitable depths, the series being at a known distance apart fore and aft, such as the available length of deck. Separate observers may listen at telephones $t'$ connected to one of the detectors, as $d'$ at each station, and these men may be provided with any usual means for measuring or recording the times of passage of shadows, such as any ordinary chronograph, or a metronome beating seconds, for a sufficiently close measurement of the duration of the time of passage of the shadow.

The acoustic shadow of a submarine affords a definite and unmistakable path along which the submarine may be approached and destroyed by a depth bomb. Referring now to Fig. 3, this diagram illustrates a convoy C with flanking destroyers or other guardships moving in the direction of the arrow. The convoy and guards move at speeds rendering an attack on the flank by proper motion of a submarine futile, but the tactics of attack by estimating at a distance the course of the convoy, and waiting in its line of progress until overtaken have heretofore placed naval and convoy commanders under handicap, the momentary observation of a periscope being the only possible indication of the waiting enemy, who may himself lie concealed and silent and rely upon the under-water sounds of the approaching convoy and guards for the direction and time of his attack.

If now a source of sound S be carried by a flanking guardship $B'$ and a detector by guardship B, a zone of detectable shadow will reach from a submarine anywhere in the sector S, $D'$, $D^2$. This sector is an acoustic net stretched between the ships $B'$, B, which can not overhaul a submarine without notice to the commander at B. Such notice is given by silence at telephone $t'$, when the submarine $u'$ is as far ahead of the convoy as the line S, $D'$, depending on the lead of the guardships.

Defensive tactics are obvious. The convoy is signaled to make a short-radius turn toward the guardship $B'$. Guardship B, having passed beyond the shadow, comes about toward the guardship $B'$ as indicated at $n$, (to port as shown) and passes into the shadow, thence either along or repeatedly through it. Cessation of the shadow on passing the line B, $B'$ indicates passage beyond the submarine, and if zigzags across the shadow have been shortening curves, then a short full turn into the shadow again at $n^2$ indicates exactly the place to drop a depth charge.

The bearing of the submarine during marked diminution of sound or silence at $t'$ is always the known bearing of the ship $B'$ carrying the source of sound.

In practice, the detector $d'$ can be relied upon to drag over and sound actual contact with a submarine overhauled along its shadow by a rapidly-moving destroyer B, moving toward the known position of the source of sound, and the indicated spot for the depth-charge is unmistakably given.

When a convoy is not practicable, a merchant vessel at the position $B'$ carrying the sound source and a companion at the position B carrying a detector can be warned of a submarine in the zone between them and sheer off. Or a single guardship leading and between two columns of ships having detectors may carry the sound source, the detectors being on the leaders of the columns. Other tactical uses will be apparent to naval commanders.

The sound-emitting device is preferably arranged at a submerged depth nearly that of the mean expected under-water position of the mine or submarine object suspected to be present, so that the shadow of the object will be nearly horizontal even when the object is relatively near the source of the sound.

While I have referred to moving the detector means $d$, etc., in respect to the acoustic shadow, it will be obvious that given a source, a detector, and an object between them, movement relative to each other of any two of these will cause detectable passage of the shadow at the detector.

The acoustic shadow herein referred to, may or may not be a zone of complete absence of audibility of the submarine sound, but is characteristically a zone of sharply changed degree of audibility, the kind or amount of the sound still perceptible in the shadow varying with the surrounding factors. Aberration in the direction of propagation of the primary acoustic radiation from the source of sound is negligibly slight, but conditions setting up secondary sources of radiation of the sound such as reflections from the surface of the water or the sea bottom or from other ships often make some sound still audible with the aid of sensitive detector means in the shadow, without preventing change in the sound due to a shadow from being clearly marked and easily recognized.

What I claim is:

1. The art of detecting the bearing of a submerged object comprising creating a submarine sound at a known position, and simultaneously observing the submarine acoustic shadow of the submerged object and the bearing of said known position.

2. The art of detecting the position of an object submerged in a body of water comprising emitting a submarine sound at a point removed from said object, and during the emission of said sound traversing the water at an angle to the known direction of propagation of said sound by sound-sensitive detector means, and observing the diminution of detection of said sound thereby.

3. The art of detecting the position of a submerged object of known dimensions comprising emitting a submarine sound from a source of known position and measuring the angular magnitude of the acoustic shadow of the object with respect to said source.

4. The art of detecting the position of a submerged object of known dimensions comprising emitting a submarine sound from a source of known position and measuring by sound-sensitive detector means moving at an angle to the bearing of said source the angular magnitude of the acoustic shadow of the object with respect to said source.

5. Sound sensitive detector means for a system for creating and observing acoustic shadows having therein a series of microphone detectors, means to submerge each of the series at a different depth, a listening telephone, and means adapted to connect the telephone to any of said detectors at will.

Signed by me at Boston, Massachusetts, this eighteenth day of January, 1918.

ELOF BENSON.